Sept. 5, 1967 A. J. VAN BUUREN 3,339,343
PURIFICATION OF GASES
Filed Jan. 21, 1965
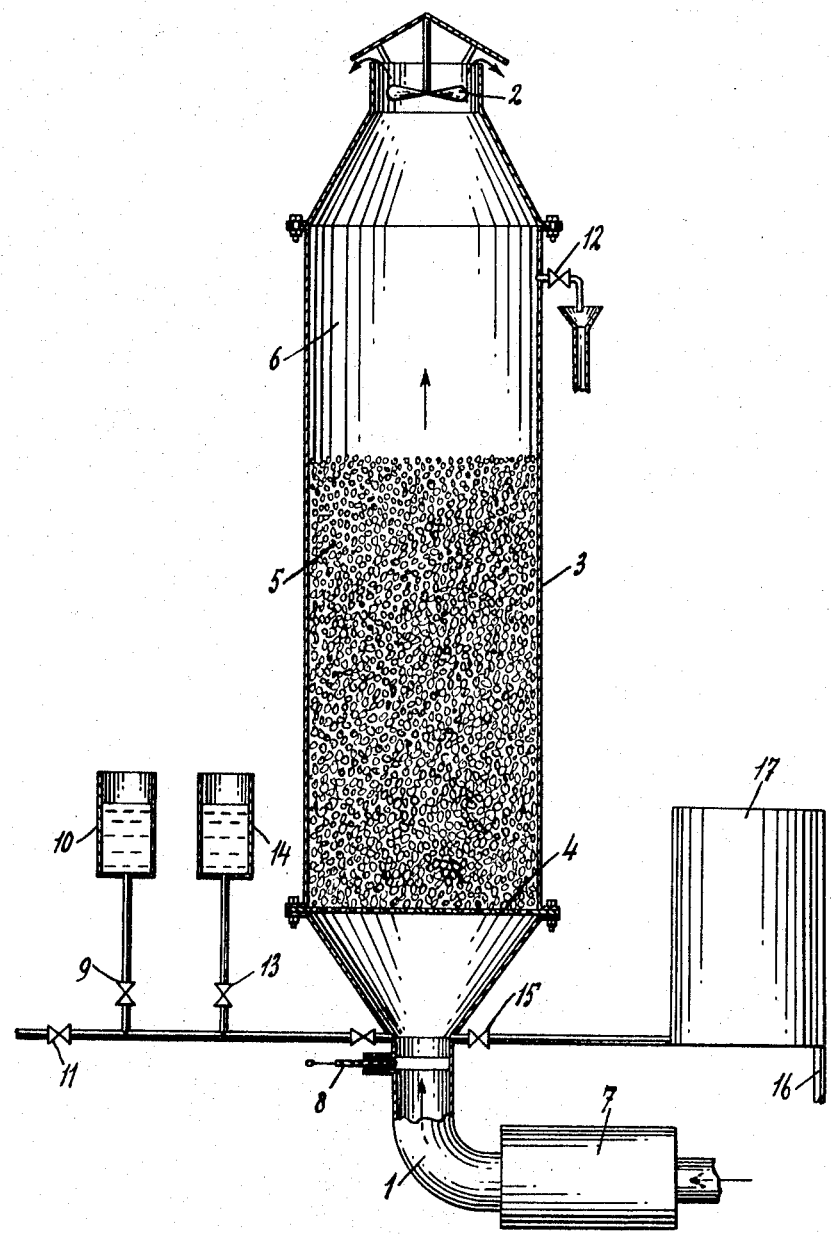

United States Patent Office 3,339,343
Patented Sept. 5, 1967

3,339,343
PURIFICATION OF GASES
Arend Jacob Van Buuren, Leidsevaartweg 119,
Heemstede, Netherlands
Filed Jan. 21, 1965, Ser. No. 427,041
4 Claims. (Cl. 55—76)

The invention relates to a process for the purification of a gas, in particular by the elimination of odorous ingredients, such as amines.

The process according to the invention is especially suitable to be used for the purification of polluted or filthy air discharged into the atmosphere by certain factories, of which a fish meal factory is a typical example. The most important odorous ingredients of such filthy air are amines.

Various methods have been proposed for removing odorous ingredients from a gas by means of a filter comprising a finely divided surface-active filter material, but up to now, the efficiency of these methods has been relatively low. Moreover, the known methods have the disadvantage that the filter material must be periodically removed from the filter to be regenerated; in this regeneration, a substantial portion of the filter material is generally lost, so that the consumption of the filter material is high.

The invention has as an object to remove the above-mentioned disadvantage and to provide a process for the purification of gases which has a high efficiency and a low consumption of filter material.

The invention is based on the use of a particular granulated resin as a filter material. This resin is obtained by the condensation of metaphenylene diamine, to which other substances may be admixed, if desired, with an aldehyde. The condensation is performed in an aqueous medium and in the presence of an acid, and the relative amounts of the metaphenylene diamine, the said other substances, the aldehyde, the acid and the water are chosen in such manner that the volume of the granular resin when dried to a constant weight is at least 25%, and preferably 30–70% of the volume of the freshly condensed granular resin in its non-dried condition.

Resins of this kind are known from Dutch Patent No. 81,911, and are commercially available under the name "Centranol W 291." They are used as anion exchangers, i.e. to remove impurities from a liquid medium.

I have found that the same resins may also be used, with a high efficiency, to remove impurities from a gas, provided that they are in an air-dry condition. If the resins are humid, the efficiency is considerably lower, since the pores of the resin granules are then filled with a liquid, so that they are inaccessible to the gas to be purified. The behavior of the present resins in a gaseous medium is essentially different from the behavior of other anion exchanging resins, which are ineffective to remove impurities from a gas. A further advantage of the present resins is that they may readily be regenerated in situ, whereby substantial losses of the filter material are avoided.

Thus, the process according to the invention consists of the steps of leading the gas to be purified through a filter comprising, as a filter material, a granular condensate of metaphenylene diamine and an aldehyde as hereinbefore specified, periodically regenerating the filter material within the filter by successive treatments with a lye and a dilute acid, and drying the filter material within the filter after each regeneration.

In order to avoid an excessive flow resistance for the gas to be purified, it is preferred to use rather large resin particles in the filter. When serving as anion exchangers in a liquid medium, the present resins usually have a particle diameter between 0.012" and 0.040". For the present purpose, it is preferred to use particles having diameters between about 0.16" and about 0.40".

The drying operation after each regeneration may be performed to advantage by leading hot air through the filter. Mechanical impurities may be removed from the gas to be purified, before the same is supplied to the filter, by means of a water bath.

The apparatus comprises a filter column filled through part of its height with the filter material, means for selectively supplying the gas to be purified, a basic regenerating liquid, an acid regenerating liquid, washing water and hot air to the lower end of the filter column, gas discharge means at the upper end of the filter column for discharging the purified gas and the hot air, liquid discharge means at the upper end of the filter column to discharge the regenerating liquids and the washing water, and ventilator means for driving the gas to be purified through the filter column.

The filter material is preferably supported in the filter column by a wire gauze grid. Other perforate materials were found to be less effective.

The invention will be further explained by reference to the accompanying drawing, showing diagrammatically in the sole figure thereof, a preferred embodiment of the apparatus according to the invention.

The apparatus shown in the drawing is used for the purification of filthy air from a factory. The air is supplied to the apparatus through a conduit 1, and is driven through the apparatus by means of a ventilator 2 at the upper end. The conduit 1 is connected with the lower end of a filter column 3. This column is provided at its lower end with a wire gauze grid 4. The grid 4 supports a resin layer 5, consisting of particles of the above specified condensate of metaphenylate diamine with an aldehyde. When the column 3 has a diameter of 40", the resin layer 5 may have a height of about 48". Above the resin layer 5, a space 6 with a height of about 24" has been left free, so that the resin may be brought into a floating condition during regeneration.

Mechanical impurities may be removed from the gas to be purified by means of a water bath 7 inserted in the conduit 1.

A valve 8 is arranged between the conduit 1 and the grid 4. When this valve is open, the filthy air is sucked through the column 3 and discharged into the atmosphere at the upper end. The air passes through the resin layer 5 whereby odorous ingredients, such as amines, are removed, so that no unpleasant odors are observed in the vicinity of the factory.

When the apparatus has been in operation during a period of time, the resin layer 5 is saturated with impurities, so that it has to be regenerated. For this purpose, valve 8 is closed, so that the air flow is interrupted, and a valve 9 is opened, so that lye is supplied to the column 3 from a tank 10. After a suitable time interval, valve 9 is closed, and valve 11 is opened, whereby washing water is supplied to the column; the lye is discharged together with the washing water through a discharge valve 12 at the upper end of the column. After a further time interval, valve 11 is closed, and valve 13 is opened, whereby a dilute acid is supplied to the column from a tank. The amount of acid supplied to the column is chosen in such manner that the resin is left in a weakly acid condition. Washing water is now again supplied to the column through valve 11, until the resin layer 5 is entirely clean.

The regeneration has now been completed, and the resin layer 5 must again be brought into an air-dry condition, so as to be fully effective for the removal of impurities from the filthy air. For this purpose, valve 15 is opened, whereby air is circulated from a conduit 16 through a heating device 17 to column 3; the resin layer 5 is now completely dried by the action of the hot air. After that, valve 8 is again opened, so that the purification is resumed.

It is pointed out that the above-described sequence, wherein the resin is first treated with a lye and then with a dilute acid during the regeneration, is essential for the required operation, since the resin is thereby left in a weakly acid condition, in which it is consderably more effective than in a basic condition.

Experiments have shown that the filthy air from a fish meal factory may be purified in the above described manner to such an extent that no unpleasant odours are observed in its vicinity.

The fact that resins of the above-specified kind are highly effective to remove odorous ingredients from a gas, whereas other anion exchanging resins do not have this effect, may be illustrated by the following examples.

*Example 1*

70.983 g. of 40%-trimethylamine were placed in a flask having a volume of 4 litres. Distilled water was added to obtain a total volume of 3 litres, and the contents were thoroughly mixed.

10 ml. of the solution were placed in an Erlenmeyer, and distilled water was added to obtain a total volume of 50 ml. The mixture was titrated with dilute sulphuric acid (0.0911 N), using bromocresol green/methyl red as an indicator. It was found that 16.57 ml. of dilute sulphuric acid were required for neutralization.

After that, the flask was placed in a glycerine bath, and connected at its upper end with a cooling device. By means of a pump, displacing 9 litres of gas in about 27 seconds, the gas in the flask was sucked through a small water separator, and through a glass tube comprising 800 ml. of an anion exchange resin which is a polystyrene-divinylbenzine resin which is strongly basic and commercially available under the name "Dowex 2." The resin formed a layer with a height of about 600 mm.

As soon as the pump was in operation, an amine odor was observed at the outlet of the glass tube, showing that the resin did not absorb any gaseous trimethylamine.

A repeated titration of 10 ml. of the contents of the flask was performed in the above-described manner after the experiment; 16.56 ml. of dilute sulphuric acid were required for neutralization, i.e. the dimethylamine percentage of the contents was practically unchanged.

*Example 2*

The experiment of Example 1 was repeated in exactly the same manner, except that the anion exchange resin was a mixture of higher polyamines and of medium basicity, and is available as "Centranol 777A." The resin did not absorb any gaseous dimethylamine.

*Example 3*

The experiment of Example 1 was repeated in exactly the same manner, except that the resin was of medium basicity and constituted by metaphenylene diamine and tetraethylene pentamine and commercially available as "Centranol 643a." The resin did not absorb any gaseous dimethylamine.

*Example 4*

The experiment of Example 1 was repeated in exactly the same manner, except that the resin was "Centranol W 291," which is one of the filter materials according to the invention. During a time interval of 66 minutes, no amine odor was observed at the outlet of the gas tube; hence, the trimethylamine vapor was substantially completely absorbed during that interval. After that, an amine odor became perceptible, showing that the resin was saturated. In a titration performed after the experiment in the above-described manner, 4.12 ml. of dilute sulphuric acid were required for neutralization, so that 21 g. of dimethylamine has been absorbed by the resin.

In all experiments, the particle size of the resin was from 0.16" to 0.40".

What is claimed is:

1. A process for the purification of a gas, said process comprising passing the gas to be purified through a filter containing, as a filter material, a granular condensate of metaphenylene diamine and an aldehyde, said condensate being produced in an aqueous medium in the presence of an acid, the relative amounts of diamine, aldehyde, acid and water being such that the volume of condensate when dried to constant weight is at least 25% of the volume of freshly prepared moist condensate, periodically regenerating said filter material within said filter by a first treatment with a lye, followed by a second treatment with a dilute acid, and drying said filter material within said filter after each regeneration.

2. A process as claimed in claim 1, wherein the particles of said filter material have diameters between about 0.16" and about 0.40".

3. A process as claimed in claim 1, wherein the drying of said filter material within said filter is carried out by passing hot air through said filter.

4. A process as claimed in claim 1, further comprising passing the gas to be purified, before the same is supplied to said filter, through a water bath in order to remove mechanical impurities.

References Cited

UNITED STATES PATENTS

| | | | |
|---|---|---|---|
| 2,211,162 | 8/1940 | Ray et al. | 55—74 X |
| 2,689,973 | 9/1954 | Lee et al. | 55—474 X |
| 3,062,739 | 11/1962 | Grits | 210—24 |

OTHER REFERENCES

Samuelson, O., Ion Exchangers in Analytical Chemistry, Wiley, 1953, pp. 24–26 and pp. 95–96. TP I 653.

REUBEN FRIEDMAN, *Primary Examiner.*

J. W. ADEE, *Assistant Examiner.*